United States Patent [19]
Funk
[11] 3,971,028
[45] July 20, 1976

[54] REMOTE LIGHT CONTROL SYSTEM

[75] Inventor: Larry L. Funk, Boonsboro, Md.
[73] Assignees: Larry L. Funk; James P. Oliver, Greencastle, Pa.

[22] Filed: Dec. 26, 1974
[21] Appl. No.: 536,649

[52] U.S. Cl. .................. 343/225; 343/228; 340/310 A
[51] Int. Cl.[2] .................. H04Q 7/00
[58] Field of Search .................. 343/225, 228; 325/8; 315/150, 154; 340/310 A, 310 R

[56] References Cited
UNITED STATES PATENTS

| | | | |
|---|---|---|---|
| 2,462,343 | 2/1949 | Wohlgemuth | 343/225 |
| 2,757,368 | 7/1956 | King | 343/225 |

*Primary Examiner*—Harold I. Pitts
*Attorney, Agent, or Firm*—B. P. Fishburne, Jr.

[57] ABSTRACT

A remote light control for homes, offices or factories consists of a radio transmitter which may be carried on the person or in an automobile and a coacting radio receiver which may be installed permanently as a part of the building wiring, or as a portable unit may be plugged into an outlet in the home or other building as an accessory. A step-down transformer and an associated ratchet relay completes the apparatus which controls the lighting circuit into which the invention is installed or with which it is used as a portable accessory. The system effects a saving of energy and adds greatly to the safety and security of home owners and to the insecurity of intruders. The invention is also a great aid to physically handicapped persons who are able to control lights within a building without the necessity of moving from place-to-place.

2 Claims, 6 Drawing Figures

FIG. 1
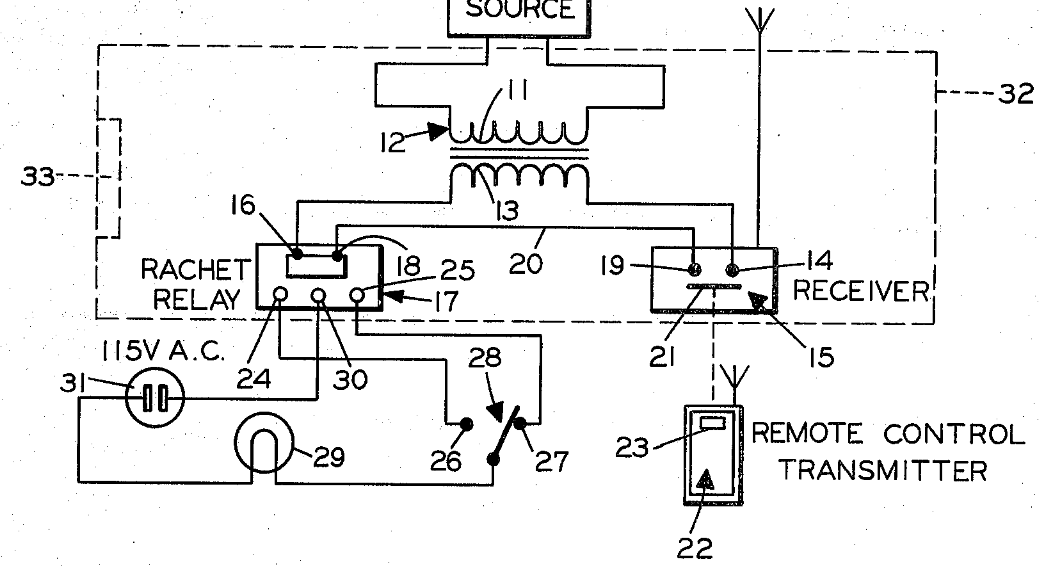
FIG. 2
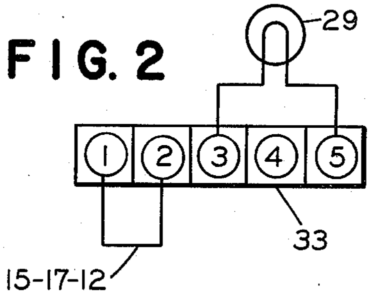
FIG. 3
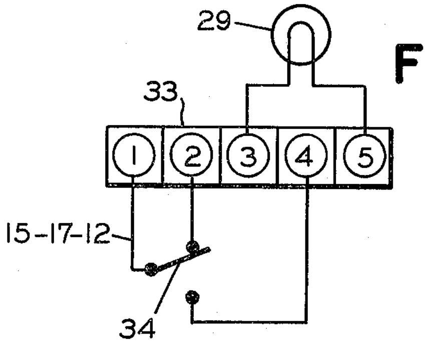
FIG. 4
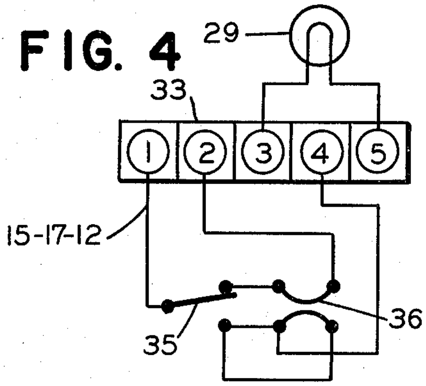
FIG. 5
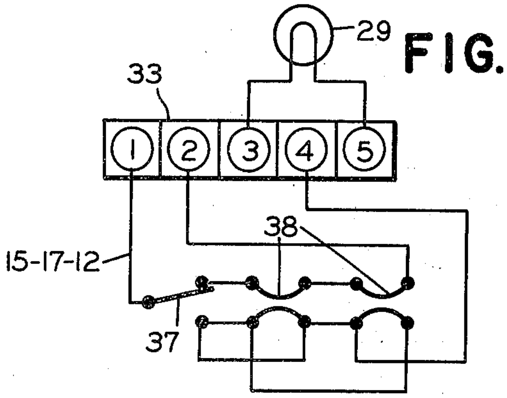
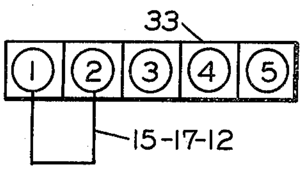
FIG. 6

REMOTE LIGHT CONTROL SYSTEM

BACKGROUND OF THE INVENTION

An increasing need exists for a simplified and economical means to remotely control lights in the home, office, store and the like. Such a means is highly desirable as an energy-saving means in that many lights which are normally left on when the home owner or worker departs the premises can be extinguished from a remote location with convenience and economy. In this connection the very small transmitter device forming a part of the invention can be carried in a pocket or purse, or in an automobile, so that the building lights can be extinguished remotely after leaving the premises or turned on prior to entering the premises.

Quite obviously, the invention adds greatly to the security and safety of home owners and particularly adds to the safety of elderly people in that doorways and exterior lights around the home can be left on during departure and extinguished when the person is safely outside of the premises. If the home owner should be in the home when an intruder approaches or enters, the remote turning on yard lights or other outside or inside lights will greatly promote the security of the home owner and the insecurity of the intruder. The above are among the principal objectives of the invention and many additional uses or applications of the invention can be visualized. Generally, the invention adds greatly to the convenience of the ordinary home lighting or office lighting system without adding significantly to the cost thereof while simultaneously supplying a safety and security illuminating system, as above-discussed.

The invention features extreme simplicity and economy in that it may be directly wired into a building lighting system during construction or may be added thereto at any time as a portable accessory by plugging into any house current outlet. The entire apparatus consists of a small portable transmitter and a coacting receiver, step-down transformer and relay which may be housed as a unit on a portable embodiment with a suitable extension cord and house current receptacle plug, or without the cord and plug on an embodiment which is wired directly into house wiring. The invention in no way interferes with the normal manual operation of house light switches and may be installed in several different ways to control lights by means of the invention only, or in conjunction with a three-way switch and one or more four-way switches. By the use of additional receivers with the same frequency around the house or building, various lighting circuits can be remotely controlled individually from inside the house or exteriorly. If preferred, all of the inside lights or all outside lights on a given building circuit may be remotely controlled by the invention in terms of a single portable transmitter and a single coacting receiver.

Other features and advantages of the invention will become apparent during the course of the following description.

BRIEF DESCRIPTION OF DRAWING FIGURES

FIG. 1 is a schematic view of a remote light control apparatus embodying the invention.

FIGS. 2, 3, 4, 5 and 6 are schematic views of different arrangements for employing the invention alone or in combination with several external light switch arrangements.

DETAILED DESCRIPTION

Referring to the drawings in detail wherein like numerals designate like parts, and referring initially to FIG. 1, the numeral 10 designates a conventional source of house current, 115 volts AC, illustrated as being wired to the primary coil 11 of a 24 volt step-down transformer 12, whose secondary coil 13 is wired to one terminal 14 of a radio receiver 15 and to one terminal 16 of a ratchet relay 17. The other terminals 18 and 19 of the ratchet relay coil and the receiver are electrically interconnected by a wire 20 in FIG. 1.

The conventional radio receiver 15 embodies a switch contact 21 across the two terminals 14 and 19 and shown open in FIG. 1. A remotely located conventional radio transmitter 22 carried on the person or in a vehicle has a push button on-off switch 23 which is utilized to produce a radio signal in response to which the radio receiver switch 21 may be closed to complete a light circuit in the home or other building.

Continuing to refer to FIG. 1, the ratchet relay 17 has normally open and normally closed contacts 24 and 25 wired, respectively, to the contacts 26 and 27 of a conventional house lighting switch 28, such as a front porch light switch located in the hallway immediately inside of the front door. The switch 28 is wired to the light 29, such as a front porch light, which in turn is wired back to a common power terminal 30 of the ratchet relay 17 through a conventional 115 volt AC receptacle 31 provided on the invention unit in the case of a portable embodiment thereof. In this latter connection, it will be understood that in some cases all of the invention components except the remote transmitter 22 will be embodied in a portable assembly housed in a suitable casing 32 which may be carried in any location in a building and plugged in to the source of house current and may have the desired lighting circuit plugged into it via the receptacle 31. Alternately, the invention may be permanently or integrally wired into the house wiring system, in which no extension cord or plug will be included on the invention and the receptacle 31 will also be eliminated. In such a case, the apparatus composed of the transformer 12, receiver 15 and ratchet relay 17 will be located at a fixed station in the house or building and directly wired to the 110 volt AC system and wired to the particular lighting circuit which it is desired to control remotely by the invention through the use of the transmitter 22. Additional light circuits inside of the house or exteriorly thereof, such as garage lights and yard lights, may be remotely controlled by the single portable transmitter 22 merely by providing additional receivers 15 with the same frequency and additional coacting components for these receivers as described and illustrated in FIG. 1. This additional remote control of plural light circuits by a single transmitter and plural receivers of a common frequency is equally applicable to the portable embodiment of the invention or the fixed embodiment where the receiver, transformer and relay unit are wired directly into house wiring.

It should be further understood that while the light 29 has been referred to as a front porch light, in practice, this could be any interior or exterior light or series of lights on a given building lighting circuit, and in this connection, the invention is completely versatile in its application.

The ratchet relay 17 is conventional and may consist of a 24 volt AC, Type 48, No. 48-6099 Ratchet Relay, manufactured by AEMCO, Mankato, Minn. The receiver 15 may be a Model 595-R Receiver and Switch Unit, manufactured by Nutone Division, Scoville Mfg. Co., Cincinnati, Ohio 45227. The remote control transmitter 22 is also a product of Nutone Division, Scoville Mfg. Co., Model No. 20. Likewise the transformer 12 may be a Nutone Transformer No. 201-N. Equivalent conventional components made by other manufacturers may be employed in the invention.

In the operation of the invention depicted in FIG. 1, the push button 23 of the remote transmitter 22 is pushed to produce a radio signal picked up by receiver unit 15. When the receiver responds to the signal from the transmitter, its switch contacts 21, 14 and 19 are closed to complete a circuit to the ratchet relay 17 via the 24 volt transformer. This activates the ratchet relay whose contacts close the associated house lighting circuit which in the embodiment shown in FIG. 1 includes a manual light switch 28 as well as the receptacle 31 for plugging a light, such as a table lamp or other lighting circuit, into a portable embodiment of the invention. If the manual switch 28 is set to extinguish the lighting circuit having light 29 therein, the ratchet relay will operate when activated to energize the light circuit. Conversely, if a particular light circuit is energized as where a person is leaving the home with certain lights on, after the person safely makes his or her exit and produces a signal with the transmitter 22, the resultant activation of the relay 17 by the receiver switch will open the associated light circuit and extinguish the lights. Upon return, the same person utilizing the portable, transmitter 22 in the same manner through the receiver 15 and ratchet relay can re-energize the light circuit prior to entering the premises.

Thus, by means of the invention and as a result of operating transmitter 22 by its push button 23, the user can open or close any light circuit which is electrically connected to the circuit of the invention unit having the receiver switch 21 therein. At the same time, the house lights can be operated in the usual manner by the regular on-off light switches in the building or outside of the building in the case of yard lights, driveway lights, etc.

FIGS. 2 through 6 show diagrammatically different adaptations of the invention in relation to the same lighting circuit. In FIG. 2, for example, a terminal block 33 which may be located in the casing 32, FIG. 1, has five numbered terminals customarily in the form of screws. The particular lighting circuit designated 29 is connected across terminals 3 and 5 while the receiver switch unit controlling the light circuit 29 is shown schematically as being connected across the terminals 1 and 2. In this situation, the light circuit is controlled by the invention alone.

In FIG. 3, the same light circuit across terminals 3 and 5 of the terminal block 33 is under control of the invention receiver switch unit composed of elements 15, 17 and 12, connected across terminals 1 and 2 and also under control of a single conventional light switch 34 inside of the building or exteriorly thereof depending on a given adaptation of the invention.

In FIG. 4, the same light circuit is under control of the invention across terminals 1 and 2 plus the control of one three-way switch 35 and one four-way switch 36, such as light switches at the top and bottom of a house stairway. Similarly, in FIg. 5, the lighting circuit 29 is controlled by the invention transmitter-receiver switch means and one three-way switch 37 plus two four-way switches 38 as might be found in the hallway of a home having two adjoining rooms at one end of the hallway.

In FIG. 6, an arrangement is shown whereby a plug-in light, such as a table lamp, may be plugged into the receptacle 31 and such plug-in light would then be controlled on or off by means of the transmitter-receiver combination only and without the manual switches as depicted in FIGS. 3, 4 and 5. A variety of hook-ups along the lines of these illustrations can be utilized depending upon the lay-out of lighting in the home or other building.

Essentially, therefore, the invention provides a very simplified and compact means which enables a user to carry the small transmitter 22 on his person or in his automobile and remotely control a selected lighting circuit or circuits inside or outside of the home or other building, as fully described in detail. Thus, when returning to a dark home, the lights may be turned on before entering for safety and security. Conversely, when leaving the home or office, the lights may be left on until after a safe exit has been made and then turned off remotely to save energy. A person sleeping in a darkened home who hears an intruder inside or outside of the building can turn on inside or outside lights by use of the transmitter. It should be clear, in light of the description, that the invention is fully capable of satisfying a large number of situations where it would be highly advantageous to control building lighting remotely, such as in the case of the physically handicapped being able to control lights in the home without the necessity of moving from room to room.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A remote control apparatus for home lighting and the like comprising a portable radio signal transmitter adapted for manual operation at a remote point, a coacting radio signal receiver adapted for placement in a home or the like having contacts which close upon reception of a radio signal by the receiver, a step down transformer having a primary coil adapted for coupling to a source of alternating house current and a secondary coil having first and second terminals, one secondary coil terminal coupled with one contact of said receiver, a ratchet relay having first and second terminals, a normally open contact, a normally closed contact and a common contact, one terminal of the ratchet relay being coupled with the second terminal of said transformer secondary coil and the secondary terminal of the ratchet relay being coupled with a second terminal of said receiver, a house lighting circuit including a manual light switch having a pair of contacts which are electrically coupled to said normally open and normally closed ratchet relay contacts, and said house lighting circuit having a conductor coupled with said common contact of the ratchet relay, said common contact having power thereon.

2. A remote control apparatus for home lighting and the like according to claim 1, and an AC house current receptacle connected in said light circuit conductor between said ratchet relay common contact and said manual light switch.

* * * * *